United States Patent
Kasai et al.

(10) Patent No.: US 7,326,271 B2
(45) Date of Patent: Feb. 5, 2008

(54) HONEYCOMB FILTER AND METHOD OF MANUFACTURING THE SAME

(75) Inventors: Yoshiyuki Kasai, Kasugai (JP); Tatsuyuki Kuki, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 357 days.

(21) Appl. No.: 11/006,604

(22) Filed: Dec. 8, 2004

(65) Prior Publication Data

US 2005/0138908 A1  Jun. 30, 2005

(30) Foreign Application Priority Data

Dec. 12, 2003  (JP)  ............... 2003-414899

(51) Int. Cl.
*B01D 46/00* (2006.01)
*F01N 3/023* (2006.01)

(52) U.S. Cl. ............ 55/523; 55/282.2; 55/282.3; 55/385.3; 55/482; 55/484; 55/DIG. 5; 55/DIG. 10; 55/DIG. 30; 60/311; 264/628; 264/630; 264/631; 264/DIG. 48

(58) Field of Classification Search ............ 55/282.2, 55/282.3, 385.3, 482, 484, 523, DIG. 10, 55/DIG. 30, DIG. 5; 60/311; 95/273, 278; 264/628, 630, 631, DIG. 48; 428/116
See application file for complete search history.

(56) References Cited

U.S. PATENT DOCUMENTS

| | | | | |
|---|---|---|---|---|
| 5,634,952 | A * | 6/1997 | Kasai et al. ............... | 55/523 |
| 6,984,253 | B2 * | 1/2006 | Ichikawa et al. ............ | 55/523 |
| 7,138,002 | B2 * | 11/2006 | Hamanaka et al. .......... | 55/523 |
| 2004/0211164 | A1 | 10/2004 | Hamanaka et al. | |
| 2005/0120691 | A1 * | 6/2005 | Miwa ........................ | 55/523 |
| 2005/0210848 | A1 * | 9/2005 | Kuki et al. ................. | 55/523 |

FOREIGN PATENT DOCUMENTS

| | | |
|---|---|---|
| EP | 0 036 321 A1 | 9/1981 |
| JP | B2-61-51240 | 11/1986 |
| JP | 03-284312 | 12/1991 |
| JP | 05-044442 | 2/1993 |
| JP | 7-241422 * | 9/1995 |
| JP | 7-241422 A | 9/1995 |
| JP | 2003-161136 * | 6/2003 |
| JP | A-2003-161136 | 6/2003 |
| WO | WO 03/011427 A | 2/2003 |

* cited by examiner

Primary Examiner—Jason M. Greene
(74) Attorney, Agent, or Firm—Oliff & Berridge, PLC (57) ABSTRACT

A honeycomb filter 1 includes a cylindrical honeycomb structure 2 having a plurality of cells 4, and plugging members 7 disposed to alternately plug openings 5 of predetermined cells 4*a* on the side of one end face 6*a* and the openings 5 of the remaining cells 4*b* on the side of the other end face 6*b* of the structure 2 in checkered flag form, and further having second plugging members 8 disposed to plug openings 5 of cells 4 which are not plugged by the first plugging member 7 on either side of two end faces 6*a* and 6*b* of the structure 2 corresponding to 0.2 to 2.5% of the area of the cross section perpendicular to the center axis of the structure 2 in a center section occupying at least ⅔ of the area from the center axis of the structure 2 to an outer circumferential surface 11.

12 Claims, 7 Drawing Sheets

HONEYCOMB FILTER AND METHOD OF MANUFACTURING THE SAME

BACKGROUND OF THE INVENTION

1. Field of the Invention

The present invention relates to a honeycomb filter and a method of manufacturing the same. More particularly, the present invention relates to a honeycomb filter which excels in heat dispersion properties during heating and is effectively prevented from being damaged due to thermal stress, and a method of manufacturing the same.

2. Description of Related Art

Particulate matter and toxic substances contained in exhaust gas from an internal combustion engine, boiler, or the like must be removed from the exhaust gas taking the environmental effects into consideration. In particular, regulations concerning removal of particulate matter (hereinafter sometimes referred to as "PM") discharged from a diesel engine have been tightened in Europe, USA, and Japan. Therefore, use of a honeycomb filter as a diesel particulate filter (hereinafter may be called "DPF") for removing PM has attracted attention. The honeycomb filter has also been used to filter liquid such as service water or sewage.

Figure 15:
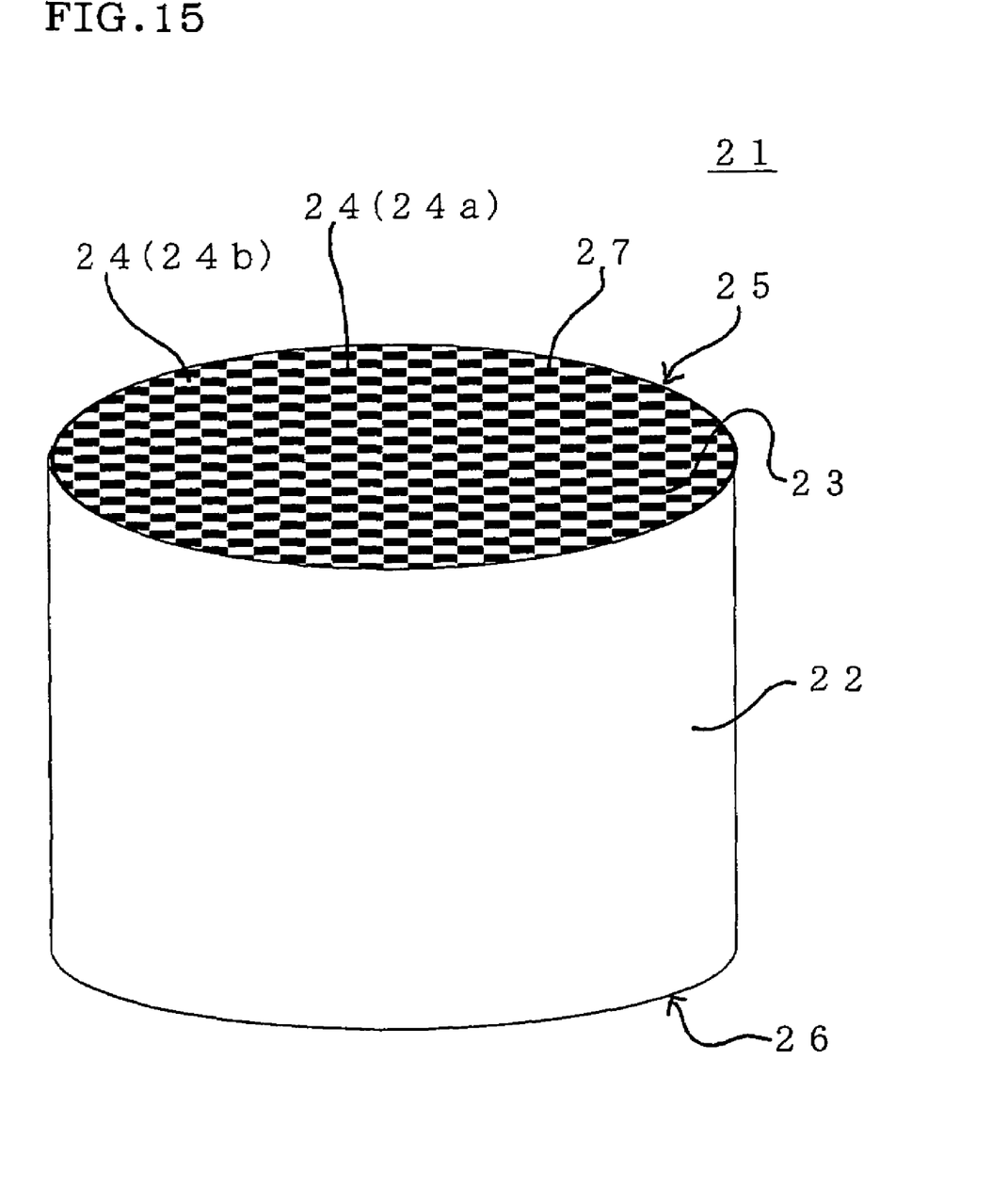
FIG. 15 is an oblique view schematically showing a conventional honeycomb filter.

As shown in FIG. 15, a honeycomb filter generally includes a cylindrical honeycomb structure 22 including a plurality of cells 24 which are partitioned by porous partition walls 23 in a honeycomb shape and function as fluid channels, and plugging members 27 disposed to alternately plug inflow openings 25 of predetermined cells 24a and outflow openings 26 of the remaining cells 24b. In a honeycomb filter 21 having such a configuration, a fluid such as gas or liquid flows into the cell 24 from the inflow opening 25 which is open without being plugged by the plugging member 27, and is discharged from the adjacent cell 24, specifically, the cell 24 which is plugged on the inflow opening 25 and is open on the outflow opening 26 through the porous partition wall 23. In this case, the partition wall 23 substantially functions as a filter, and carbon particulate matter or the like (hereinafter sometimes this expression is also referred to as PM) discharged from a diesel engine is deposited on the partition wall 23. Such a honeycomb filter 21 has a problem in which the temperature distribution inside the honeycomb structure 22 becomes uneven due to a rapid temperature change or localized heating caused by the exhaust gas, whereby cracks occur in the honeycomb structure 22. In the case of using the honeycomb filter as a DPF, it is necessary to regenerate the honeycomb filter by burning and removing the deposited carbon particulate matter. In this case, since a localized increase in temperature inevitably occurs, a high thermal stress easily occurs, whereby the honeycomb filter is damaged.

To deal with this problem, a method of dividing a honeycomb structure into a plurality of segments and bonding the segments using a bonding material (see Japanese Examined Patent Publication No. 61-51240, for example), and a honeycomb structure in which a channel separator is formed (see Japanese Patent Application Laid-open No. 2003-161136, for example) have been proposed.

It is effective to integrate the segments as in the method proposed in Japanese Examined Patent Publication No. 61-51240 in order to prevent a localized increase in temperature. However, since the step of manufacturing a number of segments and the step of integrating the segments are necessary for manufacturing one honeycomb structure, such a method is disadvantageous from the viewpoint of cost. The honeycomb structure proposed in Japanese Patent Application Laid-open No. 2003-161136 exhibits an insufficient effect of preventing damage caused by thermal stress. In particular, an increase in temperature may not be prevented or an increase in pressure loss may occur depending on the ratio of the channel separators formed. Therefore, room for further improvement remains.

SUMMARY OF THE INVENTION

The present invention has been achieved in view of the above-described problems, and provides a honeycomb filter which excels in heat dispersion properties during heating and is effectively prevented from being damaged due to thermal stress, and a method of manufacturing the same.

The present invention provides a honeycomb filter and a method of manufacturing the same given below.

(1) A honeycomb filter comprising a cylindrical honeycomb structure including a plurality of cells which are partitioned by porous partition walls in a honeycomb shape and function as fluid channels, and first plugging members disposed to alternately plug openings of predetermined cells on a side of one end face of the honeycomb structure and openings of the remaining cells on a side of the other end face of the honeycomb structure in checkered flag form; the fluid which flows into the cell being capable of being discharged through the partition wall which functions as a filtration layer, the honeycomb filter further comprising second plugging members disposed to plug the openings of the cells which are open without being plugged by the first plugging member on the side of the one end face or the side of the other end face of the honeycomb structure corresponding to 0.2 to 2.5% of an area of a cross section perpendicular to a center axis of the honeycomb structure in a center section occupying at least ⅔ of an area from the center axis of the honeycomb structure to an outer circumferential surface.

(2) The honeycomb filter according to (1), further comprising third plugging members disposed to plug the openings of the cells which are open without being plugged by the first plugging member on the side of the end face of the honeycomb structure opposite to the end face on which the second plugging members are disposed corresponding to 2.5% or less of the area of the cross section perpendicular to the center axis in the center section occupying at least ⅔ of the area from the center axis of the honeycomb structure to the outer circumferential surface.

(3) The honeycomb filter according to (1) or (2), wherein powder having powder having high heat capacity is incorporated into the cells which make up the honeycomb structure of which the opposite openings are plugged by the first plugging member and the second plugging member and/or the third plugging member.

(4) The honeycomb filter according to any of (1) to (3), wherein the second plugging members are disposed to continuously plug the openings of the cells which are open without being plugged by the first plugging member on the side of the one end face or the side of the other end face of the honeycomb structure.

(5) The honeycomb filter according to any of (2) to (4), wherein the third plugging members are disposed to continuously plug the openings of the cells which are open without being plugged by the first plugging member on the side of the end face of the honeycomb structure opposite to the end face on which the second plugging members are disposed.

(6) The honeycomb filter according to any of (1) to (5), wherein the partition wall which makes up the honeycomb structure has a porosity of 45 to 70%.

(7) The honeycomb filter according to any of (1) to (6), wherein the partition wall which makes up the honeycomb structure has a coefficient of thermal expansion of $1.2 \times 10^{-6}/°$ C. or less.

(8) The honeycomb filter according to any of (1) to (7), wherein the partition wall which makes up the honeycomb structure includes cordierite.

(9) The honeycomb filter according to any of (1) to (8), wherein the partition walls which make up the honeycomb structure have extruded skin.

(10) The honeycomb filter according to any of (1) to (9), wherein heat capacity of the second the plugging member is higher than heat capacity of the first the plugging member.

(11) The honeycomb filter according to any of (2) to (10), wherein heat capacity of the third the plugging member is higher than heat capacity of the first the plugging member.

(12) A method of manufacturing a honeycomb filter which comprises the steps of forming a cylindrical formed product in which a plurality of cells which function as fluid channels are partitioned, alternately disposing a first plugging material in openings of predetermined cells on a side of one end face of the resulting formed product and openings of the remaining cells on a side of the other end face of the formed product in checkered flag pattern to obtain a plugged formed product, and firing the plugged formed product, wherein the method further comprises, before or after firing the plugged formed product, the step of disposing a second plugging material to plug the openings of the cells which are open without disposing the first plugging material on the side of the one end face or the side of the other end face of the plugged formed product corresponding to 0.2 to 2.5% of an area of a cross section perpendicular to a center axis of the plugged formed product in a center section occupying at least ⅔ of an area from the center axis of the plugged formed product to an outer circumferential surface.

(13) The method of manufacturing a honeycomb filter according to (12), wherein powder having high heat capacity is incorporated into the cells in which the second plugging material is disposed.

Since the honeycomb filter of the present invention excels in heat dispersion properties during heating, damage caused by thermal stress are effectively prevented. The method of manufacturing a honeycomb filter of the present invention enables the above honeycomb filter to be easily and inexpensively manufactured.

DETAILED DESCRIPTION OF THE EMBODIMENT

An embodiment of the honeycomb filter and the method of manufacturing the same of the present invention is described below in detail with reference to the drawings. However, the present invention is not limited to the following embodiments. Various alterations, modifications, and improvements are possible within the scope of the present invention based on knowledge of a person skilled in the art.

Figure 1:
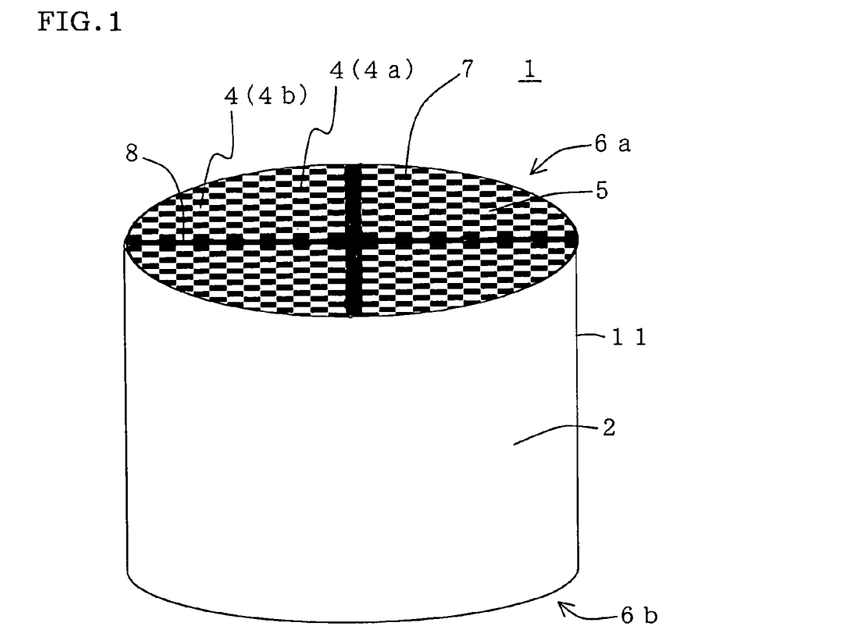
FIG. 1 is an oblique view schematically showing an embodiment of a honeycomb filter of the present invention.
Figure 2:
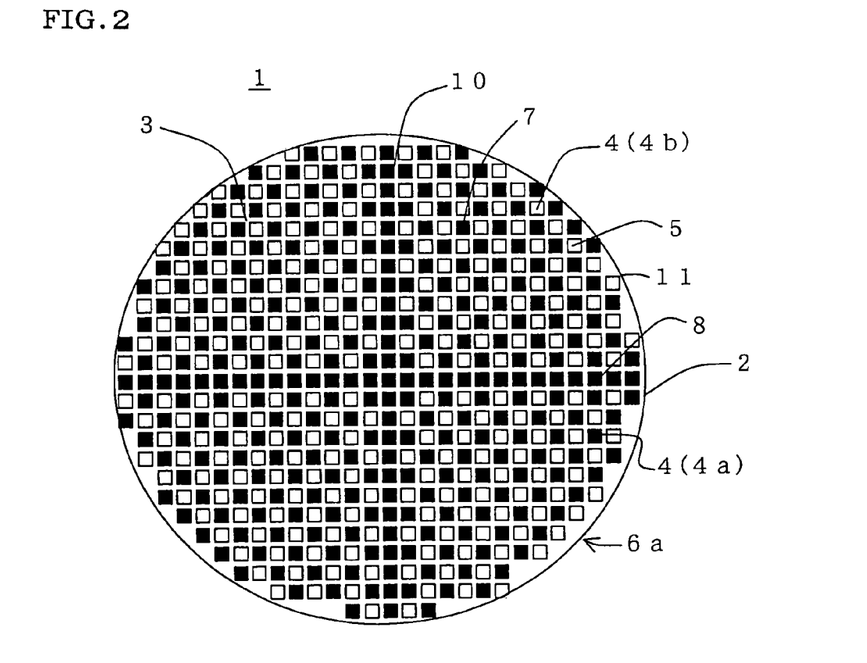
FIG. 2 is a plan view schematically showing one end face of the honeycomb filter shown in FIG. 1.
Figure 3:
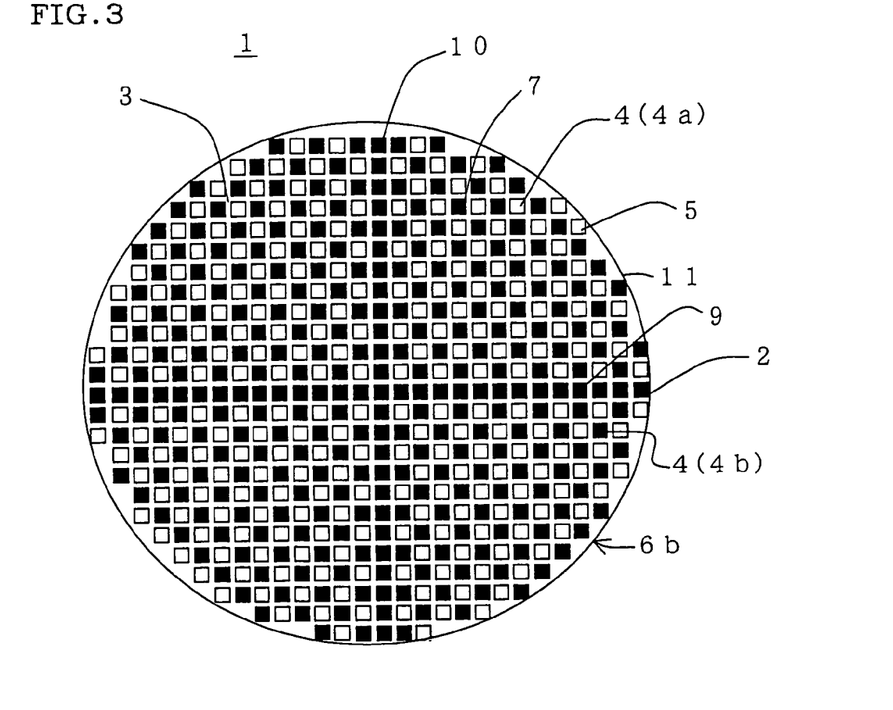
FIG. 3 is a plan view schematically showing the other end face of the honeycomb filter shown in FIG. 1.

FIG. 1 is an oblique view schematically showing one embodiment of the honeycomb filter of the present invention, FIG. 2 is a plan view schematically showing one end face of the honeycomb filter shown in FIG. 1, and FIG. 3 is a plan view schematically showing the other end face of the honeycomb filter shown in FIG. 1. As shown in FIGS. 1 to 3, a honeycomb filter 1 in the present embodiment includes a cylindrical honeycomb structure 2 including a plurality of cells 4 which are partitioned by porous partition walls 3 in a honeycomb shape and function as fluid channels, and first plugging members 7 disposed to alternately plug openings 5 of predetermined cells 4a on a side of one end face 6a of the honeycomb structure 2 and openings 5 of the remaining cells 4b on a side of the other end face 6b of the honeycomb structure 2, the fluid which has flowed into the cell 4 being capable of being discharged through the partition wall 3 which functions as a filtration layer, and the honeycomb filter 1 further including second plugging members 8 disposed to plug the openings 5 of the cells 4 which are open without being plugged by the first plugging member 7 on the side of the one end face 6a or the side of the other end face 6b of the honeycomb structure 2 corresponding to 0.2 to 2.5% of an area of a cross section perpendicular to a center axis of the honeycomb structure 2 in a center section occupying at least ⅔ of an area from the center axis of the honeycomb structure 2 to an outer circumferential surface 11. In FIGS. 1 to 3, the second plugging members 8 are disposed in the openings 5 on the side of the one end face 6a. However, the second plugging members 8 may be disposed in the openings 5 on the side of the other end face 6b. In the honeycomb filter 1 in the present embodiment, it is preferable that the second plugging member 8 be not disposed in an outer circumferential section of the honeycomb structure 2 occupying ⅓ of the area near the outer circumferential surface 11 to provide additional plugging in order to prevent PM from remaining unburned in the outer circumferential section. The outer circumferential section may be provided with additional plugging depending on the manufacturing conditions. However, it is preferable that the percentage of the additional plugging be low since the additional plugging may cause an increase in pressure loss.

In the honeycomb filter 1 in the present embodiment, cells of which the opening 5 on the side of the one end face 6a such as the inlet side opening 5 and the opening 5 on the side of the other end face 6b such as the outlet side opening 5 are plugged (hereinafter sometimes referred to as "cells 10 whose openings at both ends are plugged") are formed in the openings 5 corresponding to 0.2 to 2.5% of the area of the cross section perpendicular to the center axis of the honeycomb structure 2 in the center section occupying at least ⅔ of the area from the center axis of the honeycomb structure 2 to the outer circumferential surface 11 by providing the second plugging members 8. The heat distribution properties during heating (regeneration) can be improved by the cells 10 whose openings at both ends are plugged, whereby damage caused by thermal stress can be effectively prevented. Conventionally, in the case of using the honeycomb filter 1 as a DPF and regenerating the DPF by burning carbon particulate matter or the like collected by the partition walls 3, since combustion heat during regeneration tends to be concentrated near the center axis, the DPF may be damaged or eroded due to a rapid increase in temperature when the amount of the collected carbon particulate matter is great. In the honeycomb filter 1 in the present embodiment, the second plugging members 8 are disposed to plug the openings 5 corresponding to 0.2 to 2.5% of the area of the cross section perpendicular to the center axis in the center section occupying ⅔ of the area from the center axis of the honeycomb structure 2 to the outer circumferential surface 11 to plug some of the openings 5 on the side of the one end face 6a or the openings 5 on the side of the other end face 6b of the cells 4 in the center section. Therefore, the amount of carbon particulate matter to be deposited on the partition walls 3 which partition the center section can be reduced, whereby the amount of heat generated during regeneration can be reduced. Moreover, since carbon particulate matter or the like is not collected by the cells 10 whose openings at both ends are plugged, the generation of combustion heat at that portion is inhibited during regeneration, whereby the temperature of the cells 10 whose openings at both ends are plugged is kept lower than the temperature of other areas wherein PM combustion occurs. The cells 10 whose openings at both ends are plugged can absorb combustion heat generated in other areas to contribute to the decentralization of heat, whereby rapid combustion during regeneration is suppressed. If the percentage of the area of the openings 5 in which the second plugging members 8 are disposed (hereinafter may be called "second plugging member disposition percentage") is 0.2% or less of the area of the cross section perpendicular to the center axis of the honeycomb structure 2 in the center section occupying ⅔ of the area from the center axis of the honeycomb structure 2 to the outer circumferential surface 11, the above-described effect cannot be obtained since the number of the second plugging members 8 is too small. If the second plugging member disposition percentage exceeds 2.5%, the pressure loss of the honeycomb filter 1 is increased to a level undesirable for a filter. In the honeycomb filter 1 in the present embodiment, the second plugging member disposition percentage is still more preferably 1.3 to 2.1%.

The honeycomb filter 1 in the present embodiment preferably further includes, in addition to the second plugging members 8, third plugging members 9 disposed to plug the openings 5 of the cells 4 which are open without being plugged by the first plugging member 7 on the side of the end face of the honeycomb structure 2 opposite to the end face on which the second plugging members 8 are disposed (openings 5 on the side of the other end face 6b in FIGS. 1 to 3) corresponding to 2.5% or less of the area of the cross section perpendicular to the center axis in the center section occupying at least ⅔ of the area from the center axis of the honeycomb structure 2 to the outer circumferential surface 11. This configuration further improves the heat dispersion properties during heating, whereby damage caused by thermal stress can be effectively prevented. If the percentage of the total area of the openings 5 in which the third plugging members 9 are disposed (hereinafter may be called "third plugging member disposition percentage") exceeds 2.5% of the area of the cross section perpendicular to the center axis of the honeycomb structure 2, the pressure loss of the honeycomb filter 1 is increased to a level undesirable for a filter. In the honeycomb filter 1 in the present embodiment, the third plugging member disposition percentage is still more preferably 2.1% or less.

In the present embodiment, it is preferable that powder having high heat capacity is used to plug the specified cells among the cells 4; that is, the specified cells are the cells 5 plugged at both ends by the first plugging member 7 and the second plugging member 8 and/or the third plugging member 9. This configuration increases the amount of combustion heat absorbed by the cells 10 whose openings at both ends are plugged in which powder having high heat capacity has been for plugging during DPF regeneration. Therefore, the cells 10 whose openings at both ends are plugged efficiently contribute to the decentralization of heat, whereby rapid combustion of PM during the regeneration can be controlled effectively. As a powder having high heat capacity, silicon carbide, silicon nitride, or the like may be suitably used.

Figure 4:
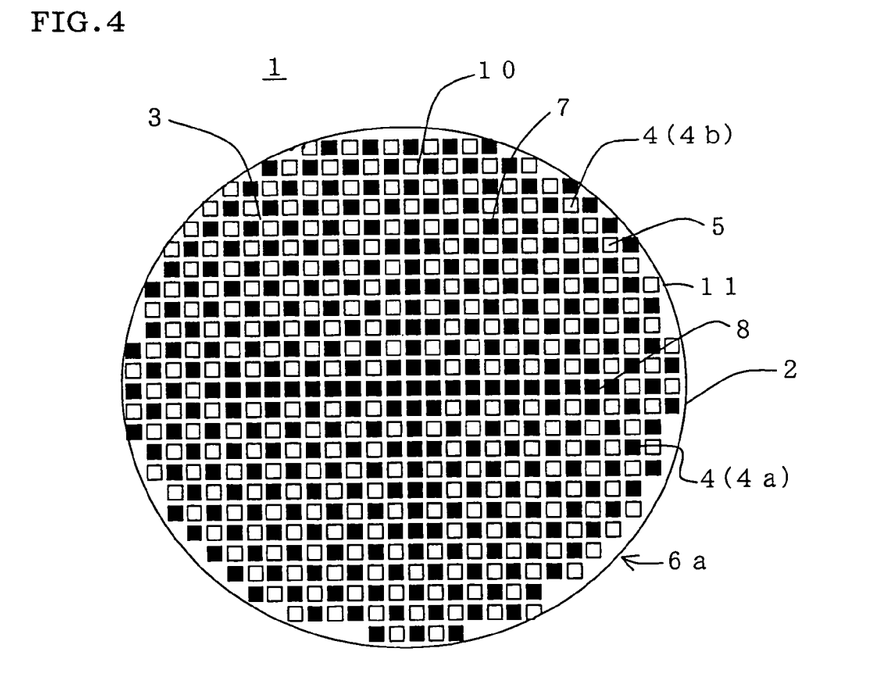
FIG. 4 is a plan view schematically showing another example of one end face in an embodiment of the honeycomb filter of the present invention.

As shown in FIG. 2, in the honeycomb filter 1 in the present embodiment, it is preferable that the second plugging members 8 be disposed to continuously plug the openings 5 of the cells 4 which are open without being plugged by the first plugging member 7 on the side of the one end face 6a or the side of the other end face 6b. In FIG. 2, the second plugging members 8 are disposed to continuously plug the openings 5 on the side of the one end face 6a. According to this configuration, the honeycomb structure 2 can be partitioned into regions having a predetermined size by the cells 10 of which the opposite openings 5 are plugged along the shape in which the openings 5 are continuously plugged by the second plugging members 8. Therefore, since heat generated at a specified region when burning carbon particulate matter or the like can be distributed well within the specified region, chain combustion caused by heating can be prevented, whereby a rapid increase in temperature can be effectively prevented. The term "continuously" used herein when referring to the case of continuously plugging the openings 5 of the cells 4 on the side of the one end face 6a or the openings 5 of the cells 4 on the side of the other end face 6b means a state in which a line connecting the closest second plugging members 8 forms a straight line or a parabola on the one end face 6a of the honeycomb filter 1, for example. In the case where the second plugging members 8 are disposed to continuously plug the openings 5 of the cells 4 on the side of the one end face 6a as shown in FIG. 2, it is preferable to form a region continuously enclosed by the second plugging members 8, or a region continuously enclosed by the outer circumferential surface 11 of the honeycomb structure 2 and the second plugging members 8 when the second plugging members 8 are disposed to reach the outer circumferential surface 11 of the honeycomb structure 2 (hereinafter may be called "segment region") on the one end face 6a of the honeycomb structure 2. The number of segment regions formed on one end face may be one or more. The honeycomb filter 1 in the present embodiment is still more preferably configured so that the ratio of the area of the smallest segment region to the area of the cross section perpendicular to the center axis of the honeycomb structure 2 (hereinafter may be called "segment area ratio") is 5 to 25%. This configuration efficiently improves the heat dispersion properties during heating. If the segment area ratio is less than 5%, dispersion of PM combustion heat which occurs near the center section may become insufficient. If the segment area ratio exceeds 25%, an increase in temperature may occur in the segment region. Therefore, the effect of providing the second plugging member 8 may be decreased. In the honeycomb filter 1 shown in FIGS. 1 to 3, since the second plugging members 8 are disposed to equally divide the one end face 6a of the honeycomb filter 1 into four, the segment area ratio is 25%. In the case where the second plugging members 8 disposed to continuously plug the openings 5 of the cells 4 on the side of the one end face 6a are interrupted before reaching the outer circumferential surface 11 of the honeycomb structure 2 on the one end face 6a of the honeycomb filter 1 as shown in FIG. 4, the segment region may be defined by assuming the extension of the line of the second plugging members 8.

In the case where some of the openings 5 of the cells 4 which are open without being plugged by the first plugging member 7 on the end face of the honeycomb structure 2 opposite to the end face on which the second plugging members 8 are disposed (openings 5 on the side of the other end face 6b in FIGS. 1 to 3) are plugged by the third plugging members 9, it is preferable that the third plugging members 9 be disposed to continuously plug the openings 5 of the cells 4 on the end face of the honeycomb structure 2 opposite to the end face on which the second plugging members 8 are disposed. It is preferable to form a segment region, specifically, a region continuously enclosed by the third plugging members 9, or a region continuously enclosed by the outer circumferential surface 11 of the honeycomb structure 2 and the third plugging members 9 when the third plugging members 9 are disposed to reach the outer circumferential surface 11 of the honeycomb structure 2 on the end face of the honeycomb structure 2 opposite to the end face on which the second plugging members 8 are disposed. It is preferable that the segment area ratio be 5 to 25%. In the case where the third plugging members 9 are interrupted, the segment region may be defined by assuming the extension of the line of the third plugging members 9 in the same manner as the second plugging members 8.

In the honeycomb filter 1 in the present embodiment, the partition wall 3 which makes up the honeycomb structure 2 has a porosity of preferably 45 to 70%, and still more preferably 55 to 65%. If the porosity of the partition wall 3 is less than 45%, the pressure loss of the honeycomb filter 1 is increased, whereby the engine performance cannot be sufficiently demonstrated when the honeycomb filter 1 is used as a DPF or the like. If the porosity of the partition wall 3 exceeds 70%, the heat capacity of the honeycomb filter 1 is decreased. This reduces heat dispersion properties of the honeycomb filter 1, whereby the internal maximum temperature may be increased during heating for filter regeneration. The "porosity" used in the present specification does not include the openings of the honeycomb structure but refers to the material porosity of the partition wall 3 which makes up the honeycomb structure 2. The porosity may be measured by using mercury porosimetry. The same value may be obtained by using a boiling method.

In the honeycomb filter 1 in the present embodiment, the partition wall 3 which makes up the honeycomb structure 2 has a coefficient of thermal expansion of preferably $1.2 \times 10^{-6}/°$ C. or less, and still more preferably $1.0 \times 10^{-6}/°$ C. or less. If the coefficient of thermal expansion of the partition wall 3 which makes up the honeycomb structure 2 exceeds $1.2 \times 10^{-6}/°$ C., damage such as deformation or cracks may occur due to the temperature difference between each section during heating for filter regeneration.

In the honeycomb structure 2 used in the present embodiment, the material for the partition wall 3 is not particularly limited. It is preferable that the partition wall 3 include a material having a comparatively high heat capacity such as cordierite even if the material has high porosity, and it is still more preferable that the major crystal phase of the partition wall 3 be cordierite. In more detail, it is preferable that 50 mass % or more of the material for the partition wall 3 be a cordierite crystal.

In the present embodiment, it is preferable that the partition walls 3 which make up the honeycomb structure 2 have extruded skin. This configuration allows excellent mechanical strength and reduces manufacturing cost. In the case of bonding small segments into which the honeycomb structure 2 is divided, separation of the bonding section may pose a problem during actual use.

The cross-sectional shape of the cell 4 is not particularly limited. The cross-sectional shape of the cell 4 may be triangular, quadrilateral, hexagonal, round, or the like.

The material for the first plugging member 7 is not particularly limited. The material for the first plugging member 7 preferably contains components the same as the components of the material for the partition wall 3 which makes up the honeycomb structure 2. Cordierite may be suitably used.

The materials for the second plugging member 8 and the third plugging member 9 are not particularly limited. The materials for the second plugging member 8 and the third plugging member 9 preferably contain components the same as the components of the material for the partition wall 3 which makes up the honeycomb structure 2. Cordierite may be suitably used as described above. In the honeycomb filter 1 in the present embodiment, it is preferable that the heat capacity of the second plugging member 8 be higher than the heat capacity of the first plugging member 7, and that the heat capacity of the third plugging member 9 be higher than the heat capacity of the first plugging member 7. Therefore, it is preferable to increase the heat capacity of the second plugging member 8 and the third plugging member 9 during manufacture by adjusting the type of the raw material, the amount of pore-forming material to be added to the raw material, and the like.

In the honeycomb filter 1 in the present embodiment, a catalyst may be supported on the surface or inside of the partition wall 3. In the case of using the honeycomb filter 1 in the present embodiment as a DPF, an oxidizing catalyst, such as a noble metal such as Pt, Pd, or Rh, an alkali metal, an alkaline earth metal, a rare earth metal, or another catalyst may be suitably used.

Figure 5:
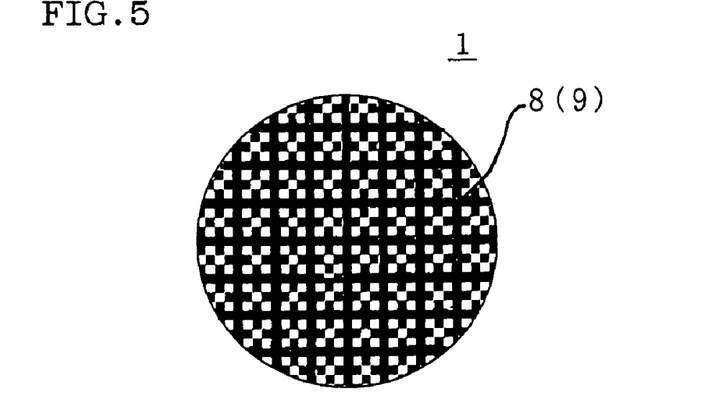
FIG. 5 is a plan view schematically showing still another example of one end face in an embodiment of the honeycomb filter of the present invention.
Figure 6:
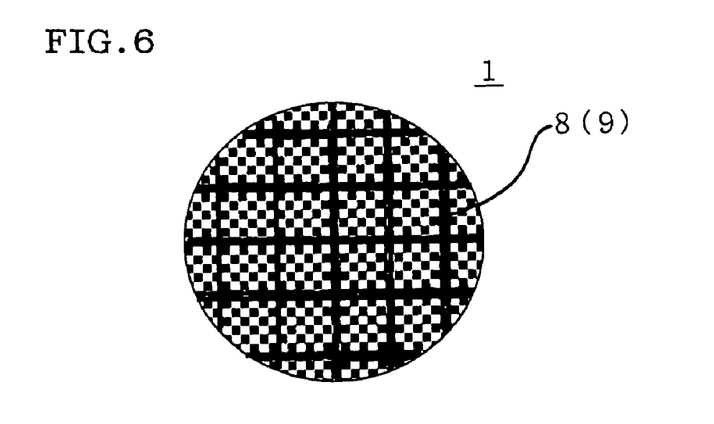
FIG. 6 is a plan view schematically showing still another example of one end face in an embodiment of the honeycomb filter of the present invention.
Figure 7:
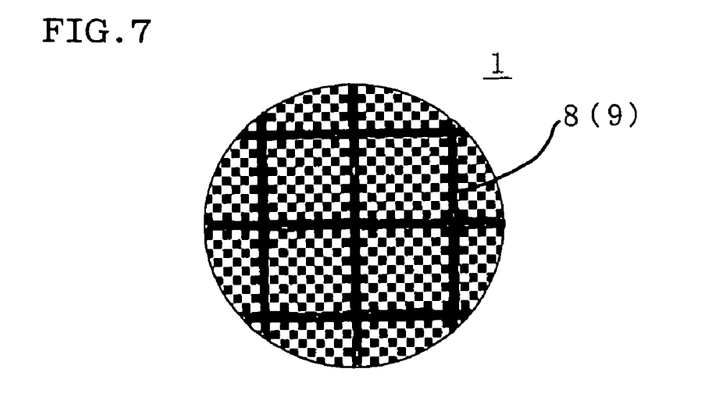
FIG. 7 is a plan view schematically showing still another example of one end face in an embodiment of the honeycomb filter of the present invention.
Figure 8:
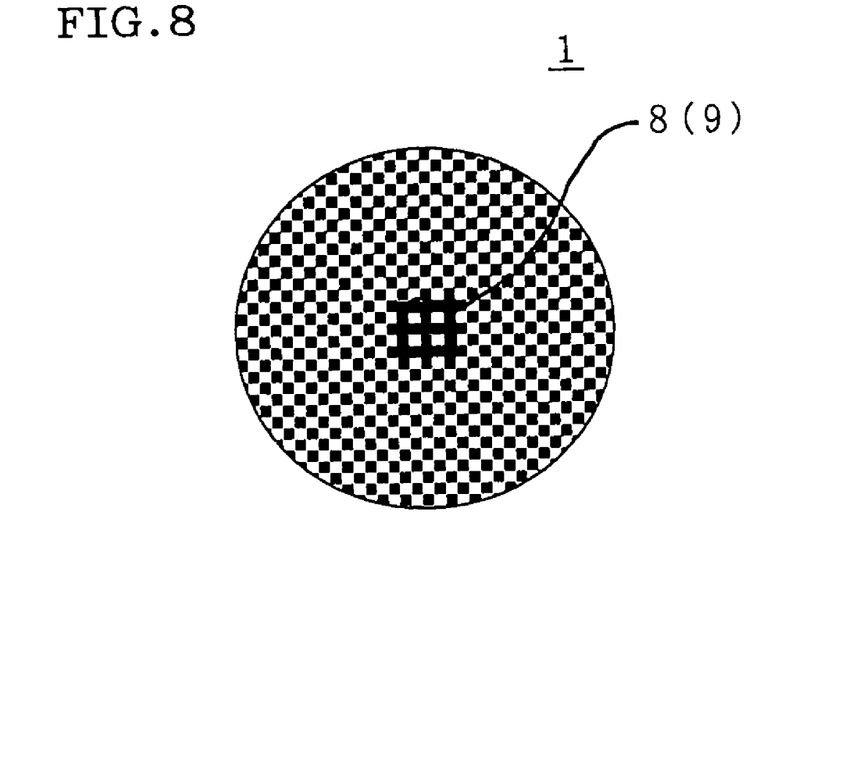
FIG. 8 is a plan view schematically showing still another example of one end face in an embodiment of the honeycomb filter of the present invention.
Figure 9:
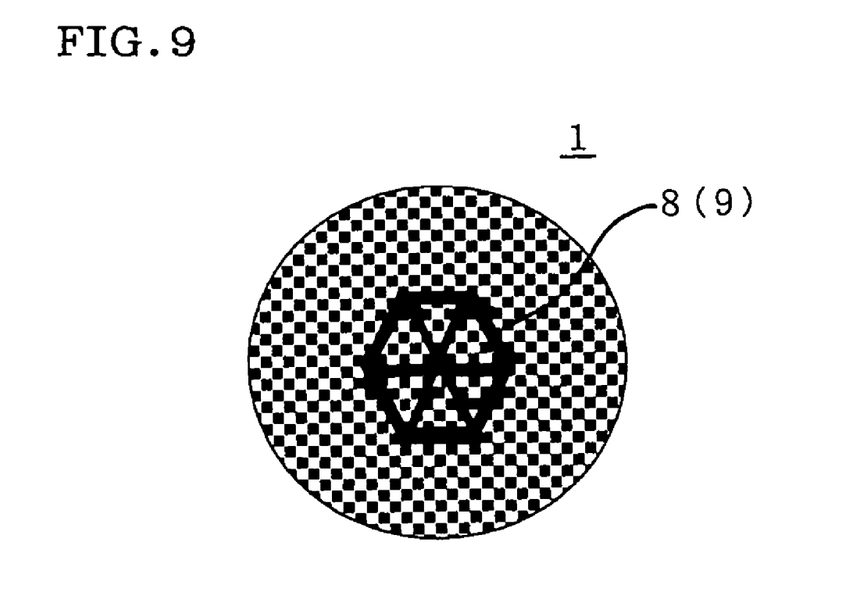
FIG. 9 is a plan view schematically showing still another example of one end face in an embodiment of the honeycomb filter of the present invention.
Figure 10:
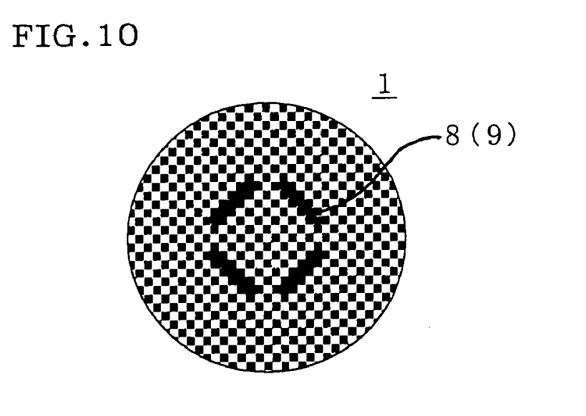
FIG. 10 is a plan view schematically showing still another example of one end face in an embodiment of the honeycomb filter of the present invention.
Figure 11:
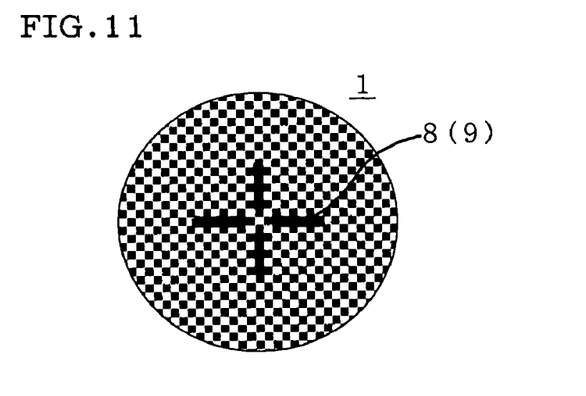
FIG. 11 is a plan view schematically showing still another example of one end face in an embodiment of the honeycomb filter of the present invention.
Figure 12:
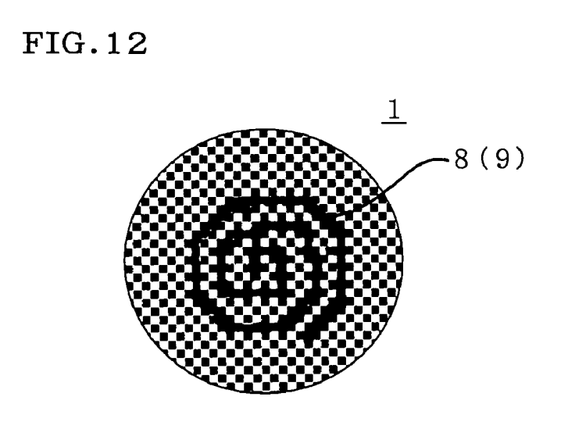
FIG. 12 is a plan view schematically showing still another example of one end face in an embodiment of the honeycomb filter of the present invention.
Figure 13:
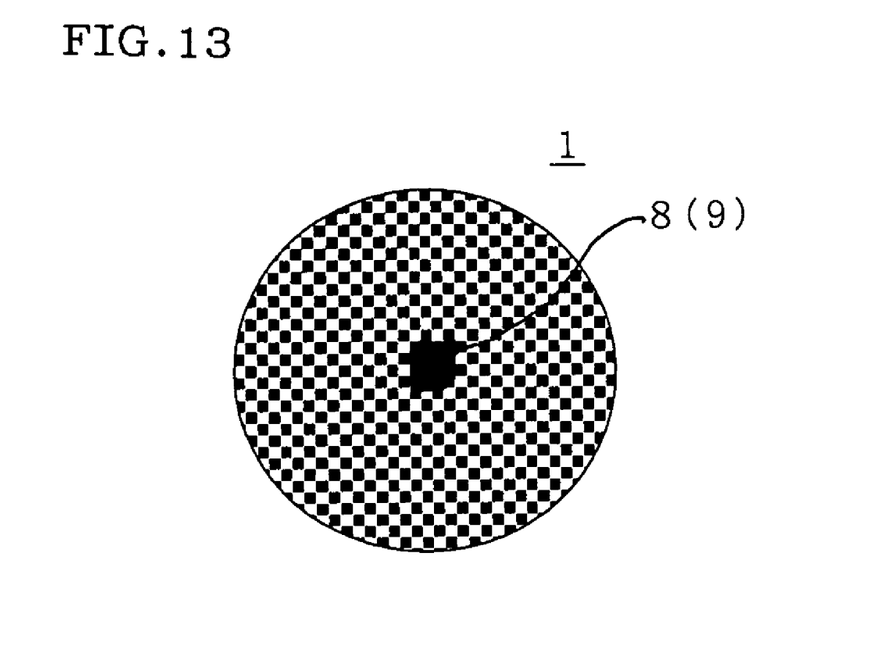
FIG. 13 is a plan view schematically showing yet another example of one end face in an embodiment of the honeycomb filter of the present invention.
Figure 14:
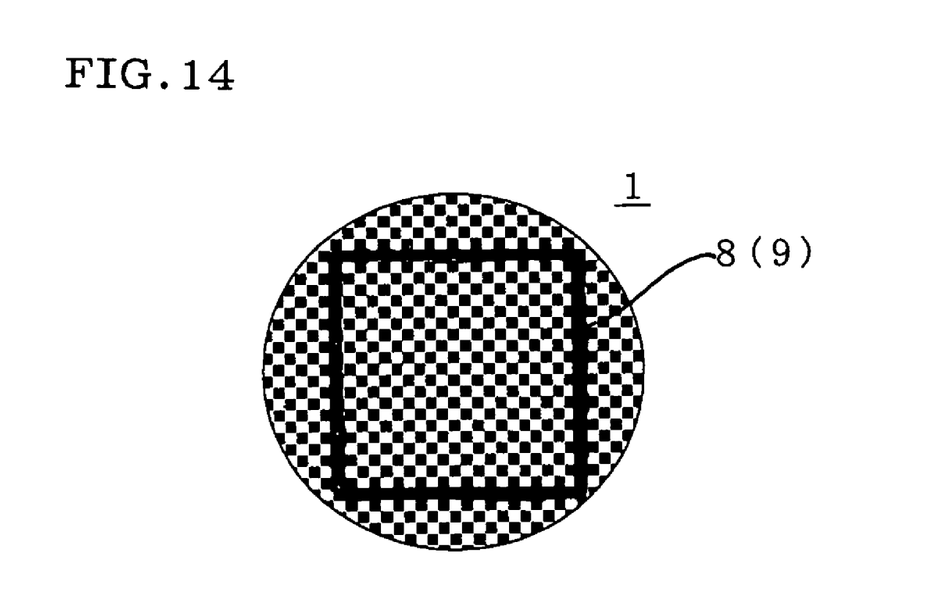
FIG. 14 is a plan view schematically showing one end face in Comparative Examples 3 and 4 of the honeycomb filter of the present invention.

In the honeycomb filter 1 shown in FIGS. 1 to 3, the second plugging members 8 and the third plugging members 9 are disposed in the shape of a cross. However, the shape in which the second plugging members 8 and the third plugging members 9 are disposed is not particularly limited. As shown in FIGS. 5 to 7, the second plugging members 8 and/or the third plugging members 9 may be disposed in the shape of a lattice. As shown in FIGS. 8 and 9, the second plugging members 8 and/or the third plugging members 9 may be disposed in the shape of a polygon such as a quadrilateral or a shape formed by a combination of these polygons. The second plugging members 8 and/or the third plugging members 9 may be disposed in the shapes shown in FIGS. 10 to 13.

The method of manufacturing the honeycomb filter in the present embodiment is described below. The method of manufacturing the honeycomb filter in the present embodiment includes forming a cylindrical formed product in which a plurality of cells which function as fluid channels are partitioned by partition walls, alternately disposing a first plugging material in openings of predetermined cells on a side of one end face of the formed product and openings of the remaining cells on a side of the other end face of the formed product in checkered flag pattern to obtain a plugged formed product, and firing the plugged formed product, the method further including, before or after firing the plugged formed product, disposing a second plugging material to plug the openings of the cells which are open without disposing the first plugging material on the side of the one end face or the side of the other end face of the plugged formed product corresponding to 0.2 to 2.5% of an area of a cross section perpendicular to a center axis of the plugged formed product in a center section occupying at least ⅔ of an area from the center axis of the plugged formed product to an outer circumferential surface. According to this configuration, the honeycomb filter 1 shown in FIG. 1 can be easily and inexpensively manufactured.

The method of manufacturing a honeycomb filter in the present embodiment is described below in more detail in the order of steps. A honeycomb structure which makes up the honeycomb filter is formed. For example, graphite is added as a pore-forming material to a cordierite-forming raw material selected from the group consisting of talc, kaolin, alumina, and silica. After the addition of a binder, a surfactant, water, and the like, the components are sufficiently mixed to prepare a plastic clay. The resulting clay is extruded using a die having a predetermined shape to obtain a cylindrical formed product in which a plurality of cells which function as fluid channels are partitioned by partition walls. The type of the cordierite-forming raw material, the amount of the pore-forming material, and the like may be adjusted depending on the coefficient of thermal expansion and porosity of the resulting honeycomb structure. The formed product may be formed using a corrugating method or the like in addition to extrusion, for example.

The resulting formed product is dried. A first plugging material which forms a first plugging member is alternately disposed in openings of predetermined cells on the side of the one end face and openings of the remaining cells on the side of the other end face of the dried formed product in checkered flag pattern to obtain a plugged formed product. The formed product may be cut to a predetermined length before or after drying the formed product. The above-described steps may be carried out according to a conventional method of manufacturing a honeycomb filter. As the first plugging material, a material made up of components the same as the components of the material for the clay for forming the honeycomb structure may be suitably used, for example.

Before or after firing the plugged formed product, a second plugging material is disposed to plug the openings of the cells which are open without disposing the first plugging material on the side of the one end face or the side of the other end face of the plugged formed product corresponding to 0.2 to 2.5% of the area of the cross section perpendicular to the center axis of the plugged formed product in the center section occupying at least ⅔ of the area from the center axis of the plugged formed product to the outer circumferential surface. As the second plugging material, a material made up of components the same as the components of the material for the clay for forming the honeycomb structure may be suitably used, for example.

The second plugging material may be disposed in the outer circumferential section occupying ⅓ of the area near the outer circumferential surface of the plugged formed product at a percentage the same as that in the center section, or the second plugging material may not be disposed in the outer circumferential section. From the viewpoint of reducing the pressure loss of the resulting honeycomb filter, it is preferable that the amount of the second plugging material disposed in the outer circumferential section occupying ⅓ of the area near the outer circumferential surface of the plugged formed product be as small as possible.

In the method of manufacturing the honeycomb filter in the present embodiment, it is preferable to dispose a third plugging material in this stage to plug the openings of the cells which are open without disposing the first plugging material on the side of the end face of the plugged formed product opposite to the end face on which the second plugging material is disposed corresponding to 0.2 to 2.5% of the area of the cross section perpendicular to the center axis in the center section occupying at least ⅔ of the area from the center axis of the plugged formed product to the outer circumferential surface. As the third plugging material, a material made up of components the same as the components of the material for the clay for forming the honeycomb structure may be suitably used, for example.

When disposing the second plugging material or the third plugging material, it is preferable to incorporate powder having high heat capacity into the cell in which the plugging material (second plugging material or third plugging material) is disposed. As the powder having high heat capacity, silicon carbide, silicon nitride, or the like may be suitably used. In the case of using the powder having high heat capacity, it is necessary to use ceramic cement or the like as the second plugging material or the third plugging material so that the material can be used as the plugging member without firing.

The plugged formed product may be fired by using a method the same as the conventional method of manufacturing a honeycomb filter. For example, the plugged formed product may be fired using an electric furnace or the like. The honeycomb filter 1 shown in FIG. 1 can be manufactured by the above-described configuration.

In the case of causing a catalyst to be supported on the resulting honeycomb filter, a solution or slurry containing the above-mentioned preferable catalyst may be wash-coated and heated.

EXAMPLES

The present invention is described below in detail based on examples. However, the present invention is not limited to the following examples.

Example 1

A slurry as a raw material for a honeycomb structure which makes up a honeycomb filter was prepared. Specifically, graphite as a pore-forming material was added to a cordierite-forming raw material consisting of talc, kaolin, alumina, and silica. After the addition of a binder, a surfactant, and water, the components were mixed. The resulting clay was extruded using a die having a predetermined shape to obtain a cylindrical formed product. The resulting formed product was dried and cut to a predetermined length. A first plugging material was disposed to alternately plug openings of predetermined cells on the side of one end face of the formed product and openings of the remaining cells on the side of the other end face in checkered flag pattern. A second plugging material and a third plugging material were respectively disposed in the openings of the cells which were open without being plugged by the first plugging material on the side of the one end face and the side of the other end face in a region corresponding to 2.1% of the area of the cross section perpendicular to the center axis of the formed product so that the openings were linearly plugged at intervals of 20 mm to form a plugged formed product. The first plugging material, the second plugging material, and the third plugging material were prepared using the same material as the material for the partition wall. The second plugging material and the third plugging material were disposed to be symmetrical on the side of the one end face and the side of the other end face of the honeycomb structure.

The plugged formed product thus obtained was fired using an electric furnace to obtain a honeycomb filter (Example 1). An oxidizing catalyst was caused to be supported on the honeycomb filter of this example after firing in a predetermined amount per unit volume. The honeycomb filter of this example was in the shape of a cylinder having a diameter of 144 mm and an axial length of 144 mm. The thickness of the partition wall partitioning the cells functioning as fluid channels was 0.3 mm, and the cell pitch was 1.47 mm. Table 1 shows the diameter (mm) of the honeycomb filter, the disposition interval (mm) of the second plugging member and the third plugging member, the disposition percentage (%) of the second plugging member and the third plugging member in the center section occupying ⅔ of the area from the center axis of the honeycomb filter to the outer circumferential surface (hereinafter may be simply called "disposition percentage"), the porosity (%), and the coefficient of thermal expansion ($\times 10^{-6}$/° C.) of Example 1.

Air at room temperature was caused to pass through the honeycomb filter of Example 1 so that the space velocity (SV) was 5000 min$^{-1}$, and the pressure loss was measured in this state. A PM active regeneration test (hereinafter may be simply called "regeneration test") was performed as follows. After depositing a predetermined amount of soot using a diesel engine having a common rail injection system, the exhaust temperature was increased to 600° C. by post injection. When the pressure loss started to decrease, the engine speed was decreased to idle speed, and the engine was stopped after 10 minutes from the start of post injection. In the PM active regeneration test, the maximum temperature inside the honeycomb filter was measured by inserting a number of thermocouples into the honeycomb filter. After the PM active regeneration test, the presence or absence of cracks and melting was confirmed. The results are shown in Table 1.

TABLE 1

| | Filter diameter (mm) | Disposition interval (mm) | Disposition percentage (%) | Porosity (%) | Coefficient of thermal expansion ($\times 10^{-6}$/° C.) | Pressure loss (kPa) | Regeneration temperature (° C.) | Cracks | Melting |
|---|---|---|---|---|---|---|---|---|---|
| Example 1 | 144 | 20 | 2.1 | 60 | 0.8 | 4.4 | 800 | Absent | Absent |
| Example 2 | 144 | 30 | 1.4 | 60 | 0.8 | 4.2 | 810 | Absent | Absent |
| Example 3 | 144 | 50 | 0.6 | 60 | 0.8 | 4.1 | 850 | Absent | Absent |
| Example 4 | 144 | 72 | 0.6 | 60 | 0.8 | 3.9 | 900 | Absent | Absent |
| Example 5 | 144 | 10 | 0.3 | 60 | 0.8 | 3.9 | 850 | Absent | Absent |

Examples 2 to 5

A honeycomb filter configured in the same manner as in Example 1 was manufactured except for disposing the second plugging material and the third plugging material in the shape of a lattice (Examples 2 and 3), a cross (Example 4), or the shape shown in FIG. 8 (Example 5) so that the disposition percentage in the center section was 1.4% (Example 2), 0.6% (Example 3), 0.6% (Example 4), or 0.3% (Example 5), respectively according to the disposition interval shown in Table 1. The honeycomb filters of Examples 2 to 5 thus obtained were subjected to the measurement of pressure loss, the measurement of the regeneration temperature in the PM active regeneration test, and confirmation of the presence or absence of cracks and melting using the same method as that for the honeycomb filter of Example 1. The results are shown in Table 1.

Comparative Example 1

A honeycomb filter configured in the same manner as in Example 1 was manufactured except for disposing the second plugging material and the third plugging material in the shape of a lattice at intervals of 10 mm so that the disposition percentage in the center section was 3.9%. The honeycomb filter of Comparative Example 1 thus obtained was subjected to the measurement of pressure loss, the measurement of the regeneration temperature in the PM active regeneration test, and confirmation of the presence or absence of cracks and melting using the same method as that for the honeycomb filter of Example 1. The results are shown in Table 2.

TABLE 2

|  | Filter diameter (mm) | Disposition interval (mm) | Disposition percentage (%) | Porosity (%) | Coefficient of thermal expansion (×10⁻⁶/° C.) | Pressure loss (kPa) | Regeneration temperature (° C.) | Cracks | Melting |
|---|---|---|---|---|---|---|---|---|---|
| Comparative Example 1 | 144 | 10 | 3.9 | 60 | 0.8 | 5 | 780 | Absent | Absent |
| Comparative Example 2 | 144 | — | 0 | 60 | 0.8 | 3.9 | 1340 | Absent | Absent |
| Comparative Example 3 | 144 | 80 | 0 | 60 | 0.8 | 3.9 | 1040 | Absent | Absent |
| Comparative Example 4 | 144 | 100 | 0 | 60 | 0.8 | 4 | 1220 | Present | Absent |

Comparative Example 2

A honeycomb filter configured in the same manner as in Example 1 was manufactured except for alternately plugging the openings of the cells on the side of the one end face and the side of the other end face using only the first plugging member without using the second plugging material and the third plugging material. The honeycomb filter of Comparative Example 2 thus obtained was subjected to the measurement of pressure loss, the measurement of the regeneration temperature in the PM active regeneration test, and confirmation of the presence or absence of cracks and melting using the same method as that for the honeycomb filter of Example 1. The results are shown in Table 2.

Comparative Examples 3 and 4

A honeycomb filter configured in the same manner as in Example 1 was manufactured except for disposing the second plugging material 8 and the third plugging material 9 in the shape of a square having a side length of 80 mm (Comparative Example 3) or a square having a side length of 100 mm (Comparative Example 4) while avoiding the center section occupying ⅔ of the area from the center axis of the honeycomb structure making up the honeycomb filter to the outer circumferential surface so that the disposition percentage in the center section was 0%. The honeycomb filter of Comparative Examples 3 and 4 thus obtained was subjected to the measurement of pressure loss, the measurement of the regeneration temperature in the PM active regeneration test, and confirmation of the presence or absence of cracks and melting using the same method as that for the honeycomb filter of Example 1. The results are shown in Table 2.

In the honeycomb filters of Examples 1 to 5, since the position of the high temperature region which is originally concentrated on the center section was moved toward the outer circumferential section, the amount of heat in the center section was decentralized, whereby the maximum temperature to be generated was lowered. In the honeycomb filter of Comparative Example 1, since an increase in pressure loss was excessive, a decrease in engine output and an increase in fuel consumption may occur when the honeycomb filter is used as a DPF. In the honeycomb filters of Comparative Examples 2 to 4, a rapid increase in temperature was confirmed during regeneration.

Examples 6 to 10

A honeycomb filter configured in the same manner as in Example 2 was manufactured except for changing the porosity of the honeycomb filter by changing the grain size of the cordierite-forming raw material and the amount of the pore-forming material. The porosity of the honeycomb filters of Examples 6 to 10 is shown in Table 1. The honeycomb filters of Examples 6 to 10 thus obtained were subjected to the measurement of pressure loss, the measurement of the regeneration temperature in the PM active regeneration test, and confirmation of the presence or absence of cracks and melting using the same method as that for the honeycomb filter of Example 1. The results are shown in Table 3. The pressure loss was decreased by increasing the porosity of the honeycomb filter. In the honeycomb filter with a porosity of 40% (Example 6), an increase in pressure loss was observed to an acceptable extent. In the honeycomb filter with a porosity of 75% (Example 10), the temperature of the PM active regeneration test was gradually increased due to a decrease in heat capacity. From these results, the porosity of the honeycomb filter would preferably be 45 to 70%.

Comparative Example 5

A honeycomb filter configured in the same manner as in Example 10 was manufactured except for alternately plugging the openings of the cells on the side of the one end face and the side of the other end face using only the first plugging member without using the second plugging material and the third plugging material. The honeycomb filter of Comparative Example 5 thus obtained was subjected to the measurement of pressure loss, the measurement of the regeneration temperature in the PM active regeneration test, and confirmation of the presence or absence of cracks and melting using the same method as that for the honeycomb filter of Example 1. The results are shown in Table 3. The honeycomb filter of Comparative Example 5 had an extremely high regeneration temperature in the PM active regeneration test. Moreover, occurrence of cracks and melting was confirmed.

TABLE 3

| | Filter diameter (mm) | Disposition interval (mm) | Disposition percentage (%) | Porosity (%) | Coefficient of thermal expansion ($\times 10^{-6}$/° C.) | Pressure loss (kPa) | Regeneration temperature (° C.) | Cracks | Melting |
|---|---|---|---|---|---|---|---|---|---|
| Example 6 | 144 | 30 | 2.1 | 40 | 0.8 | 5 | 750 | Absent | Absent |
| Example 7 | 144 | 30 | 2.1 | 45 | 0.7 | 4.8 | 770 | Absent | Absent |
| Example 8 | 144 | 30 | 2.1 | 60 | 0.8 | 4.2 | 810 | Absent | Absent |
| Example 9 | 144 | 30 | 2.1 | 70 | 0.9 | 4.2 | 970 | Absent | Absent |
| Example 10 | 144 | 30 | 2.1 | 75 | 0.9 | 4.1 | 1100 | Negligible | Negligible |
| Comparative Example 5 | 144 | — | 0 | 75 | 0.9 | 3.8 | 1350 or higher | Present | Present |

Examples 11 to 14

A honeycomb filter configured in the same manner as in Example 2 was manufactured except for changing the coefficient of thermal expansion of the honeycomb filter by changing the grain size of the cordierite-forming raw material and the amount of the pore-forming material. The honeycomb filters of Examples 11 to 14 thus obtained were subjected to the measurement of pressure loss, the measurement of the regeneration temperature in the PM active regeneration test, and confirmation of the presence or absence of cracks and melting using the same method as that for the honeycomb filter of Example 1. The results are shown in Table 4. In the honeycomb filters of Examples 11 to 14, a significant difference in the PM active regeneration test was not confirmed. In Example 14 in which the coefficient of thermal expansion was comparatively high, minute cracks occurred to an acceptable extent.

Comparative Example 6

A honeycomb filter configured in the same manner as in Example 14 was manufactured except for alternately plugging the openings of the cells on the side of the one end face and the side of the other end face using only the first plugging member without using the second plugging material and the third plugging material. The honeycomb filter of Comparative Example 6 thus obtained was subjected to the measurement of pressure loss, the measurement of the regeneration temperature in the PM active regeneration test, and confirmation of the presence or absence of cracks and melting using the same method as that for the honeycomb filter of Example 1. The results are shown in Table 4. The coefficient of thermal expansion of the honeycomb filter of Comparative Example 6 is the same as the coefficient of thermal expansion of the honeycomb filter of Example 14.

However, since the honeycomb structure making up the honeycomb filter was broken in some portions and apart from the other portions, it was confirmed that the honeycomb filter of Comparative Example 6 could not be used as a filter.

TABLE 4

| | Filter diameter (mm) | Disposition interval (mm) | Disposition percentage (%) | Porosity (%) | Coefficient of thermal expansion ($\times 10^{-6}$/° C.) | Pressure loss (kPa) | Regeneration temperature (° C.) | Cracks | Melting |
|---|---|---|---|---|---|---|---|---|---|
| Example 11 | 144 | 30 | 2.1 | 60 | 0.8 | 4.2 | 810 | Absent | Absent |
| Example 12 | 144 | 30 | 2.1 | 60 | 1 | 4.2 | 830 | Absent | Absent |
| Example 13 | 144 | 30 | 2.1 | 60 | 1.2 | 4.2 | 820 | Absent | Absent |
| Example 14 | 144 | 30 | 2.1 | 60 | 1.4 | 4.2 | 830 | Negligible | Absent |
| Comparative Example 6 | 144 | — | 0 | 60 | 1.4 | 3.9 | 1350 or higher | Present | Present |

Example 15

A honeycomb filter configured in the same manner as in Example 1 was manufactured except for forming the honeycomb filter in the shape of a cylinder with a diameter of 200 mm and an axial length of 144 mm and disposing the second plugging material and the third plugging material in the shape of a cross at the disposition intervals shown in Table 5 so that the disposition percentage in the center section was 0.4%. The honeycomb filter of Example 15 thus obtained was subjected to the measurement of pressure loss, the measurement of the regeneration temperature in the PM active regeneration test, and confirmation of the presence or absence of cracks and melting using the same method as that for the honeycomb filter of Example 1. The results are shown in Table 5.

Comparative Example 7

A honeycomb filter configured in the same manner as in Example 15 was manufactured except for alternately plugging the openings of the cells on the side of the one end face and the side of the other end face using only the first plugging member without using the second plugging material and the third plugging material. The honeycomb filter of Comparative Example 7 thus obtained was subjected to the measurement of pressure loss, the measurement of the regeneration temperature in the PM active regeneration test, and confirmation of the presence or absence of cracks and melting using the same method as that for the honeycomb filter of Example 1. The results are shown in Table 5.

TABLE 5

| | Filter diameter (mm) | Disposition interval (mm) | Disposition percentage (%) | Porosity (%) | Coefficient of thermal expansion ($\times 10^{-6}$/° C.) | Pressure loss (kPa) | Regeneration temperature (° C.) | Cracks | Melting |
|---|---|---|---|---|---|---|---|---|---|
| Example 15 | 200 | 100 | 0.4 | 60 | 0.8 | 3.9 | 900 | Absent | Absent |
| Comparative Example 7 | 200 | — | 0 | 60 | 0.8 | 3.9 | 1350 or higher | Present | Present |

As is clear from the regeneration temperature in the PM active regeneration test of Comparative Example 7, the amount of heat generated during the PM active regeneration test is increased as the diameter of the honeycomb filter is increased, whereby an increase in temperature during regeneration occurs to a large extent. However, the honeycomb filter of Example 15 could prevent an increase in temperature during regeneration.

Since the honeycomb filter of the present invention excels in heat dispersion properties during heating and is effectively prevented from being damaged due to thermal stress, the honeycomb filter can be suitably used as a DPF or the like. The method of manufacturing the honeycomb filter of the present invention enables the above honeycomb filter to be easily and inexpensively manufactured.

What is claimed is:

1. A honeycomb filter comprising a cylindrical honeycomb structure including a plurality of cells which are partitioned by porous partition walls in a honeycomb shape and function as fluid channels, and first plugging members disposed to alternately plug openings of predetermined cells on a side of one end face of the honeycomb structure and openings of the remaining cells on a side of the other end face of the honeycomb structure in checkered flag form; the fluid which flows into the cells being capable of being discharged through the partition walls which function as a filtration layer,
wherein the honeycomb filter further comprises second plugging members disposed to plug the openings of the cells which are open without being plugged by the first plugging members on the side of the one end face or the side of the other end face of the honeycomb structure corresponding to 0.2 to 2.5% of an area of a cross section perpendicular to a center axis of the honeycomb structure in a center section occupying at least ⅔ of an area from the center axis of the honeycomb structure to an outer circumferential surface, wherein heat capacity of the second plugging members is higher than heat capacity of the first plugging members.

2. The honeycomb filter according to claim 1, further comprises third plugging members disposed to plug the openings of the cells which are open without being plugged by the first plugging members on the side of the end face of the honeycomb structure opposite to the end face on which the second plugging members are disposed corresponding to 2.5% or less of the area of the cross section perpendicular to the center axis in the center section occupying at least ⅔ of the area from the center axis of the honeycomb structure to the outer circumferential surface.

3. The honeycomb filter according to claim 2, wherein powder having high heat capacity is incorporated into the cells which make up the honeycomb structure of which the opposite openings are plugged by the first plugging members, the second plugging members and/or the third plugging members.

4. The honeycomb filter according to claim 1, wherein the second plugging members are disposed to continuously plug the openings of the cells which are open without being plugged by the first plugging members on the side of the one end face or the side of the other end face of the honeycomb structure.

5. The honeycomb filter according to claim 2, wherein the third plugging members are disposed to continuously plug the openings of the cells which are open without being plugged by the first plugging members on the side of the end face of the honeycomb structure opposite to the end face on which the second plugging members are disposed.

6. The honeycomb filter according to claim 1, wherein the partition wall which makes up the honeycomb structure has a porosity of 45 to 70%.

7. The honeycomb filter according to claim 1, wherein the partition wall which makes up the honeycomb structure has a coefficient of thermal expansion of $1.2 \times 10^{-6}$/° C. or less.

8. The honeycomb filter according to claim 1, wherein a material for the partition wall which makes up the honeycomb structure includes cordierite.

9. The honeycomb filter according to claim 1, wherein the partition walls which make up the honeycomb structure have extruded skin.

10. The honeycomb filter according to claim 2, wherein heat capacity of the third plugging members is higher than heat capacity of the first plugging members.

11. A method of manufacturing a honeycomb filter, the method comprising forming a cylindrical formed product in which a plurality of cells which function as fluid channels are partitioned, alternately disposing a first plugging material in openings of predetermined cells on a side of one end face of the resulting formed product and openings of the remaining cells on a side of the other end face of the formed product in checkered flag pattern to obtain a plugged formed product, and firing the plugged formed product,
wherein the method further comprises, before or after firing the plugged formed product, disposing a second plugging material to plug the openings of the cells which are open without disposing the first plugging material on the side of the one end face or the side of the other end face of the plugged formed product corresponding to 0.2 to 2.5% of an area of a cross section perpendicular to a center axis of the plugged formed product in a center section occupying at least ⅔ of an area from the center axis of the plugged formed product to an outer circumferential surface, wherein heat capacity of the second plugging material is higher than heat capacity of the first plugging material.

12. The method of manufacturing a honeycomb filter according to claim 11, wherein powder having high heat capacity is incorporated into the cells in which the second plugging material is disposed.

* * * * *